US012691717B2

(12) United States Patent
Kruse et al.

(10) Patent No.: US 12,691,717 B2
(45) Date of Patent: Jul. 28, 2026

(54) ROAD-SURFACE INCLINED-STATE DETECTION METHOD AND VEHICLE CONTROL METHOD

(71) Applicant: Hitachi Astemo, Ltd., Hitachinaka (JP)

(72) Inventors: Benjamin Kruse, Sunbury, OH (US); Michael Sadie, Sunbury, OH (US)

(73) Assignee: ASTEMO, LTD., Tokyo (JP)

( * ) Notice: Subject to any disclaimer, the term of this patent is extended or adjusted under 35 U.S.C. 154(b) by 0 days.

(21) Appl. No.: 18/958,321

(22) Filed: Nov. 25, 2024

(65) Prior Publication Data

US 2026/0184128 A1 Jul. 2, 2026

(51) Int. Cl.
*B60G 17/018* (2006.01)

(52) U.S. Cl.
CPC ........ *B60G 17/018* (2013.01); *B60G 2300/07* (2013.01); *B60G 2400/0512* (2013.01); *B60G 2400/0522* (2013.01); *B60G 2400/202* (2013.01); *B60G 2400/252* (2013.01); *B60G 2500/10* (2013.01); *B60G 2600/602* (2013.01)

(58) Field of Classification Search
CPC .............. B60G 17/018; B60G 2300/07; B60G 2400/0512; B60G 2400/0522; B60G 2400/202; B60G 2400/252; B60G 2500/10; B60G 2600/602
See application file for complete search history.

(56) References Cited

U.S. PATENT DOCUMENTS

| | | | | |
|---|---|---|---|---|
| 5,839,082 | A | * 11/1998 | Iwasaki | ................ B60G 17/015 280/5.507 |
| 6,694,226 | B2 | * 2/2004 | Tobaru | ................ B60R 21/0133 701/1 |
| 2002/0002859 | A1 | 1/2002 | Gesele et al. | |
| 2023/0410528 | A1 | * 12/2023 | Weston | .................. G06V 20/56 |

FOREIGN PATENT DOCUMENTS

| | | |
|---|---|---|
| EP | 3194223 B1 | 3/2019 |
| JP | 5978501 B2 | 8/2016 |

OTHER PUBLICATIONS

Extended European Search Report dated Mar. 23, 2026, issued in counterpart EP Application No. 25217548.4 (9 pages).

* cited by examiner

*Primary Examiner* — Sizo B Vilakazi
(74) *Attorney, Agent, or Firm* — WHDA, LLP

(57) ABSTRACT
A road-surface inclined-state detection method includes an acquisition step of acquiring a vehicle state where pitching moment causing front wheels of a vehicle to move upward in a vertical direction relative to rear wheels of the vehicle is applied to the vehicle, and where rear suspensions suspending the rear wheels are stroked in a compressing direction, a count step of starting counting after the vehicle state acquired in the acquisition step meets a predetermined condition, and continuing the counting until the vehicle state fails to meet the predetermined condition, and an inclined-state detection step of detecting an inclined state of a road surface R on which the vehicle travels, according to count values counted in the count step.

13 Claims, 6 Drawing Sheets

ROAD-SURFACE INCLINED-STATE DETECTION METHOD AND VEHICLE CONTROL METHOD

BACKGROUND OF THE INVENTION

The present invention relates to a road-surface inclined-state detection method and a vehicle control method.

In recent years, for vehicles such as automobiles, configurations to control parts mounted on a vehicle with the aim of stabilizing the attitude of the vehicle during traveling have been proposed.

Under such circumstances, Japanese Patent No. 5978501 discloses a configuration related to a vehicle-attitude correction control device and, particularly in a two-wheeled vehicle, enabling to control an actuated state or the like of a brake or an engine of the vehicle, so that, when the vehicle has a backward rolling tendency at the time of a jump, backward roll control is executed as vehicle-attitude correction control to cause a force to act in a direction in which the front side of the vehicle lowers and suppress the backward rolling tendency and, when the vehicle has a forward rolling tendency at the time of a jump, forward roll control is executed as the vehicle-attitude correction control to cause a force to act in a direction in which the front side of the vehicle rises and suppress the forward rolling tendency.

SUMMARY OF THE INVENTION

However, according to the studies by the present inventors, while the configuration disclosed in Japanese Patent No. 5978501 is aimed at improving the stability of a vehicle at the time of a jump of the vehicle, it is disclosed that, when a vehicle is jumping and the pitch angle of the vehicle is large, the configuration corrects the pitch attitude of the vehicle by increasing or decreasing the rotation speed of the rear wheels by adjustment of the braking force and the driving force of the rear wheels, or by decreasing the rotation speed of the front wheels by adjustment of the braking force of the front wheels.

According to further studies of the present inventors, while the jump and the pitch angle of a vehicle itself are considered at the time of correction of the attitude of the vehicle in this configuration, the inclined state of a road surface on which the vehicle travels is not taken into account at all, and the present inventors find that there is room for improvement in this point. According to further studies of the present inventors, since the braking force and the driving force of the rear wheels and the braking force of the front wheels are normally adjusted by a driver of the vehicle on his/her will and by his/her operation, and if there is a sudden intervention by the vehicle when an attitude change in the vehicle occurs, the driver is likely to receive a feeling of strangeness. Therefore, the present inventors find that there is room for improvement in this point.

The present invention has been made in view of the above studies, and an object of the present invention is to provide a road-surface inclined-state detection method that can appropriately detect the inclined state of a road surface on which a vehicle travels, and further to provide a vehicle control method that can appropriately detect the inclined state of a road surface on which a vehicle travels and that can appropriately control the attitude of the vehicle in a manner in which a feeling of strangeness received by a driver is decreased.

In order to achieve the above object, one aspect of the present invention provides a road-surface inclined-state detection method, comprising: an acquisition step of acquiring a vehicle state where pitching moment causing front wheels of a vehicle to move upward in a vertical direction relative to rear wheels of the vehicle is applied to the vehicle, and where rear suspensions suspending the rear wheels are stroked in a compressing direction; a count step of starting counting after the vehicle state acquired in the acquisition step meets a predetermined condition, and continuing the counting until the vehicle state fails to meet the predetermined condition; and an inclined-state detection step of detecting an inclined state of a road surface on which the vehicle travels, according to count values counted in the count step.

Another aspect of the present invention provides a vehicle control method, comprising: a calculation step of calculating a pitch angular velocity of a vehicle, a pitch angle of the vehicle, and a velocity in a vertical direction of a sprung mass of the vehicle; a count step of starting counting after the pitch angular velocity, the pitch angle, and the velocity in the vertical direction calculated in the calculation step all exceed predetermined thresholds that are each set corresponding thereto; a ramp-size calculation step of calculating a ramp size according to count values counted in the count step when a road surface on which the vehicle travels is a ramp road surface; and a control step of controlling damping forces of at least either front suspensions or rear suspensions of the vehicle according to the ramp size calculated in the ramp-size calculation step.

Still another aspect of the present invention provides a vehicle control method, comprising: a calculation step of calculating a pitch angular velocity of a vehicle, a pitch angle of the vehicle, and a velocity in a vertical direction of a sprung mass of the vehicle, where high-pass filter processing to decrease offset components and drift components in the pitch angular velocity, the pitch angle, and the velocity in the vertical direction is applied; a count step of starting counting after the pitch angular velocity, the pitch angle, and the velocity in the vertical direction calculated in the calculation step while the high-pass filter processing is applied thereto all exceed predetermined thresholds that are each set corresponding thereto; an inclined-state detection step of detecting an inclined state of a road surface on which the vehicle travels, according to count values counted in the count step; and a control step of controlling damping forces of at least either front suspensions or rear suspensions of the vehicle according to the inclined state detected in the inclined-state detection step.

A road-surface inclined-state detection method according to one aspect of the present invention includes: an acquisition step of acquiring a vehicle state where pitching moment causing front wheels of a vehicle to move upward in a vertical direction relative to rear wheels of the vehicle is applied to the vehicle and where rear suspensions suspending the rear wheels are stroked in a compressing direction; a count step of starting counting after the vehicle state acquired in the acquisition step meets a predetermined condition, and continuing the counting until the vehicle state fails to meet the predetermined condition; and an inclined-state detection step of detecting an inclined state of a road surface on which the vehicle travels, according to count values counted in the count step. Accordingly, the inclined state of a road surface on which a vehicle travels can be appropriately detected.

A vehicle control method according to another aspect of the invention includes: a calculation step of calculating a pitch angular velocity of a vehicle, a pitch angle of the vehicle, and a velocity in a vertical direction of a sprung mass of the vehicle; a count step of starting counting after the pitch angular velocity, the pitch angle, and the velocity in the vertical direction calculated in the calculation step all exceed predetermined thresholds that are each set to correspond thereto; a ramp-size calculation step of calculating a ramp size according to count values counted in the count step when a road surface is a ramp surface; and a control step of controlling damping forces of at least either front suspensions or rear suspensions of the vehicle according to the ramp size calculated in the ramp-size calculation step. Accordingly, the inclined state of a road surface on which a vehicle travels can be appropriately detected, and the attitude of the vehicle can be appropriately controlled in a manner in which a feeling of strangeness received by the driver is decreased.

A vehicle control method according to still another aspect of the present invention includes: a calculation step of calculating a pitch angular velocity of a vehicle, a pitch angle of the vehicle, and a velocity in a vertical direction of a sprung mass of the vehicle, where high-pass filter processing to decrease offset components and drift components in the pitch angular velocity, the pitch angle, and the velocity in the vertical direction is applied at the time of calculation of these values; a count step of starting counting after the pitch angular velocity, the pitch angle, and the velocity in the vertical direction calculated in the calculation step while the high-pass filter processing is applied thereto all exceed predetermined thresholds that are each set corresponding thereto; an inclined-state detection step of detecting an inclined state of a road surface according to count values counted in the count step; and a control step of controlling damping forces of at least either front suspensions or rear suspensions of the vehicle according to the inclined state detected in the inclined-state detection step. Accordingly, the inclined state of a road surface on which a vehicle travels can be appropriately detected, and the attitude of the vehicle can be appropriately controlled in a manner in which a feeling of strangeness received by the driver is decreased.

DETAILED DESCRIPTION OF THE PREFERRED EMBODIMENTS

Figure 1:
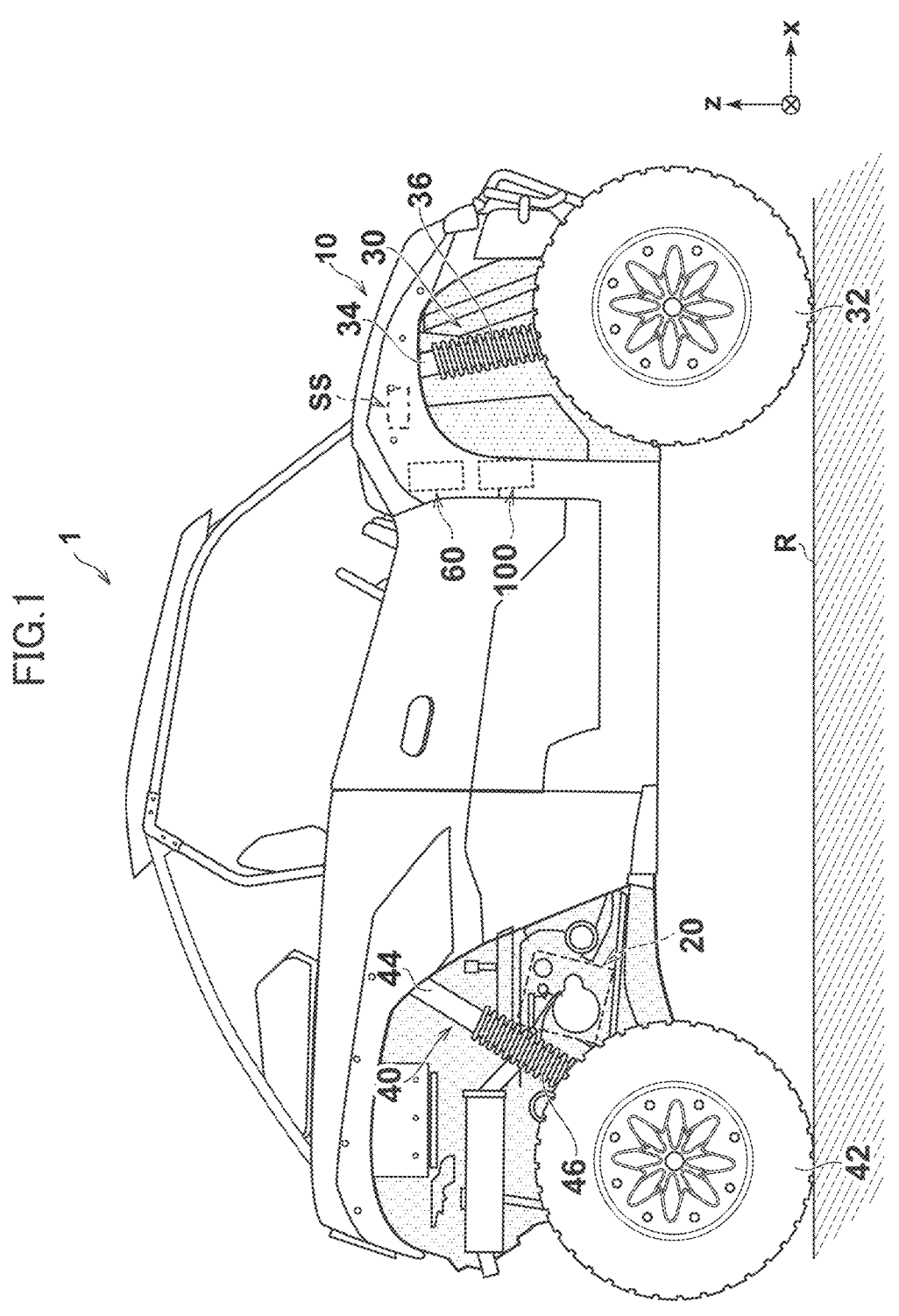
FIG. 1 is a side view illustrating a right side of a vehicle on which a vehicle control system and a vehicle control device according to an embodiment of the present invention are mounted.

A vehicle control system, a vehicle control device, and a vehicle control method according to an embodiment of the present invention are described below in detail with reference to the drawings as appropriate. In the drawings, an x-axis, a y-axis, and a z-axis form a triaxial orthogonal coordinate system. Assuming the direction of the x-axis as the longitudinal direction and the traveling direction of a vehicle, the forward direction thereof is represented by the positive direction of the x-axis. Assuming the direction of the y-axis as the width direction of the vehicle, the left direction thereof is represented by a direction penetrating through the drawings of FIGS. 1 and 3 from the near side to the far side. Assuming the direction of the z-axis as the upper-lower direction and the vertical direction of the vehicle, the upper direction thereof is represented by the positive direction of the z-axis. A horizontal plane is assumed to be parallel to a plane defined by the x-axis and the y-axis.

[Configuration Related to Vehicle]

A configuration of a vehicle to which the positive direction of the y-axis is applied as the left direction of the width direction of the vehicle according to the present embodiment is explained in detail first with reference to FIG. 1.

FIG. 1 is a side view illustrating a right side of a vehicle on which a vehicle control system and a vehicle control device according to the present embodiment are mounted. While only a front suspension, a front wheel, a rear suspension, and a rear wheel arranged on the right side are illustrated in FIG. 1, they are typically pairs of right and left parts, and a front suspension, a front wheel, a rear suspension, and a rear wheel are similarly arranged also on the left side.

As representatively illustrated in FIG. 1 as a side-by-side vehicle which is one type of small and lightweight four-wheeled off-road automobiles, a vehicle 1 typically includes a vehicle body 10 made of a metallic framework member such as an iron pipe material or an iron plate material (not illustrated), a drive source 20 that outputs a driving force of the vehicle 1, front suspensions 30 each interposed between the vehicle body 10 and a front wheel 32 to suspend the front wheel 32, and rear suspensions 40 each interposed between the vehicle body 10 and a rear wheel 42 to suspend the rear wheel 42, as main components. The vehicle 1 may be a vehicle called UTV (Utility Task Vehicle) or ROV (Recreational Off-highway Vehicle) as well as the vehicle called side-by-side vehicle. Alternatively, the vehicle 1 may be a three-wheeled automobile or the like as well as the four-wheeled automobile. An engine being an internal combustion engine, an electrical motor, or a combination of an engine and an electrical motor is applicable as the drive source 20. In the vehicle 1, it suffices that drive wheels are either the front wheels 32 or the rear wheels 42, or both thereof and steered wheels are only the front wheels 32 or both of the front wheels 32 and the rear wheels 42. A road surface on which the vehicle 1 travels is denoted by reference sign R.

Each of the front suspensions 30 is electrically controlled and typically has an oil front damper 34, and a front spring 36 as a coil spring made of a metal or the like. The front suspensions 30 are each capable of variably adjusting the damping force of the front damper 34 by activating an actuator (not illustrated) to increase or decrease the orifice diameter or the like of the front damper 34. As required, the front suspensions 30 are each additionally capable of variably adjusting the vehicle height that is the height of the vehicle body 10 from the road surface at a front side part of the vehicle 1 by increasing or decreasing the oil supply amount or the like to change the stroke position in the bump direction or the rebound direction. Similarly, each of the rear suspensions 40 is electrically controlled and typically has an oil rear damper 44, and a rear spring 46 as a coil spring made of a metal or the like. The rear suspensions 40 are each capable of variably adjusting the damping force of the rear damper 44 and, as required, are additionally capable of variably adjusting the vehicle height at a rear side part of the vehicle 1. While the front suspension 30 and the rear suspension 40 are illustrated as a strut type in FIG. 1, those of other forms having a configuration in which a damper and a spring are arranged on different shafts may be used.

In the vehicle 1, a drive-source control device 60 that controls the operating state of the drive source 20 is attached to the vehicle body 10 or a support member coupled thereto. The drive-source control device 60 operates with a battery (not illustrated) mounted on the vehicle 1 as a power supply and is mainly constituted of an ECU (Electronic Control Unit) that is an arithmetic processing device including a microcomputer or the like comprised of a CPU (Central Processing Unit) and the like. For example, when an engine is applied as the drive source 20, the drive-source (engine) control device 60 controls the activated states of constituent elements of a firing system, a fuel supply system, and an air intake system such as a spark plug, an injector, and a throttle valve (all not illustrated) to control the operating state of the drive source (engine) 20. When an electrical motor is applied as the drive source 20, the drive-source (motor) control device 60 controls the activated state, i.e., ON and OFF of a switching element of an inverter (not illustrated) to control the operating state of the drive source (motor) 20. A control program and control data to be used by the drive-source control device 60 are stored in advance in a memory (not illustrated), and are read from the memory at the time of execution.

[Configuration and Operation Related to Vehicle Control System and Vehicle Control Device]

A configuration and an operation related to the vehicle control system and the vehicle control device according to the present embodiment are explained in detail next with reference also to FIGS. 2 to 8.

Figure 2:
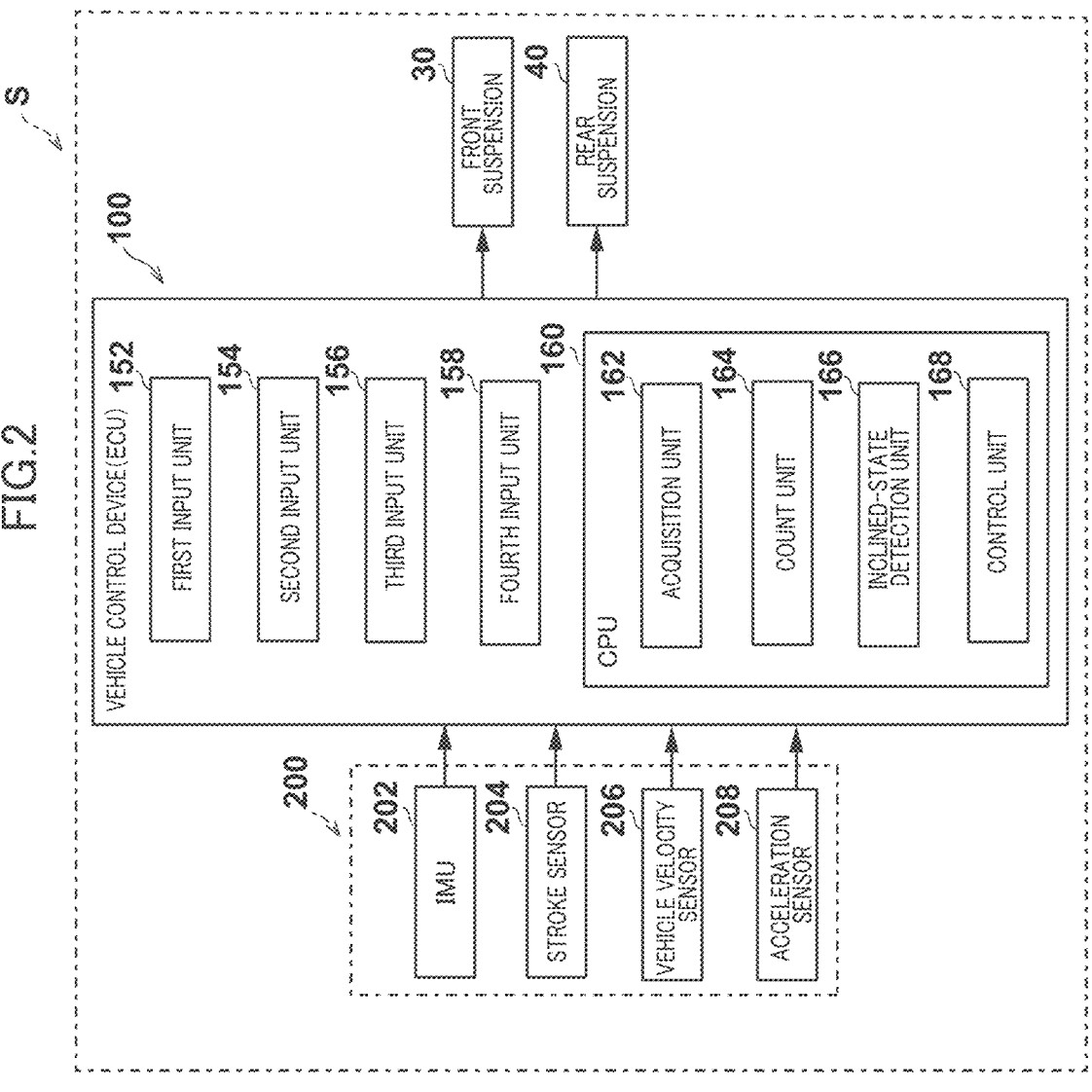
FIG. 2 is a schematic diagram illustrating a configuration of the vehicle control system and the vehicle control device according to the present embodiment.
Figure 3:
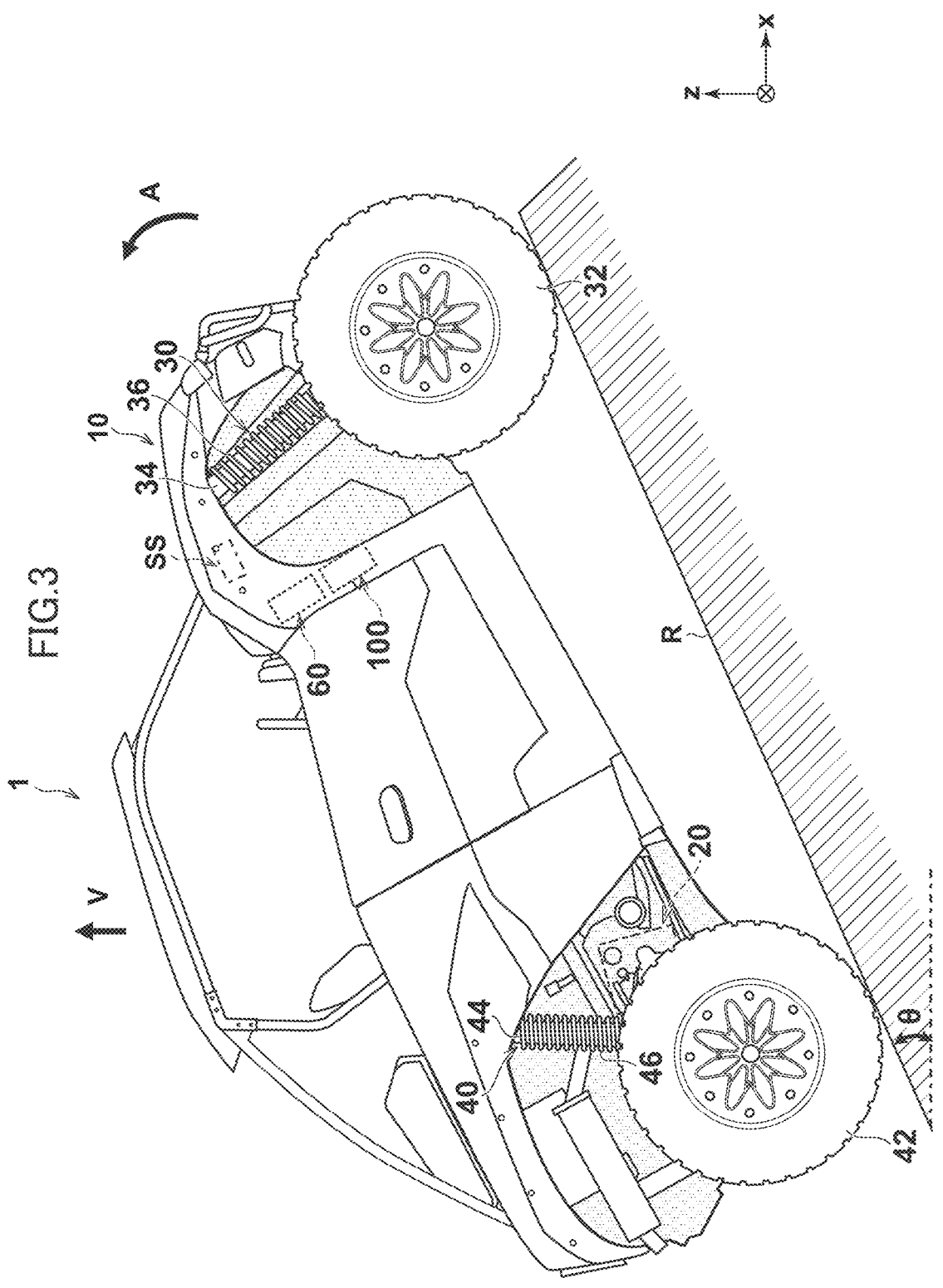
FIG. 3 is a side view illustrating a right side of the vehicle on which the vehicle control system and the vehicle control device according to the present embodiment are mounted and that is in an inclined state.
Figure 4:
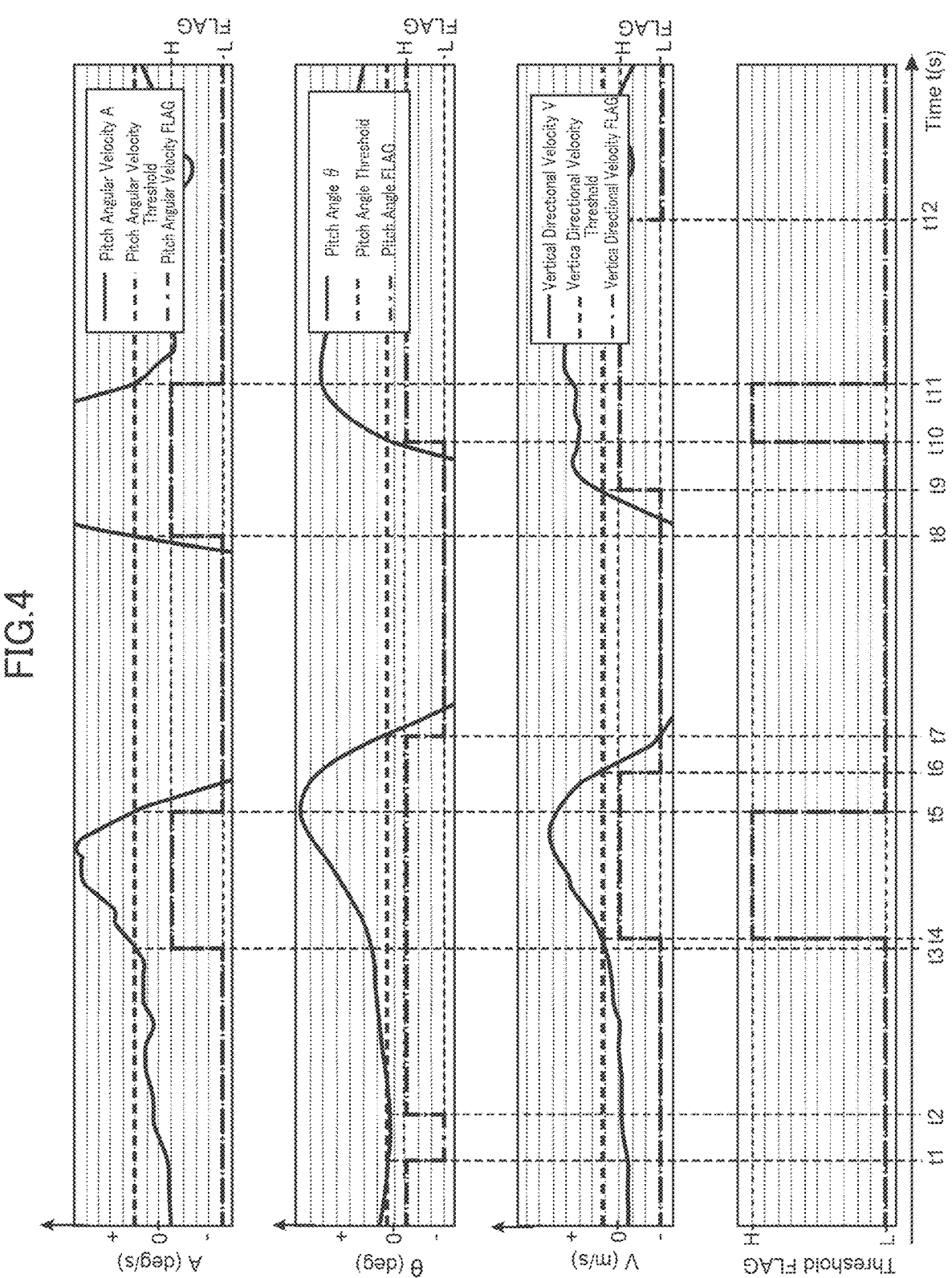
FIG. 4 is a time chart illustrating one example of operations of the vehicle control system and the vehicle control device according to the present embodiment.
Figures 5, 6:
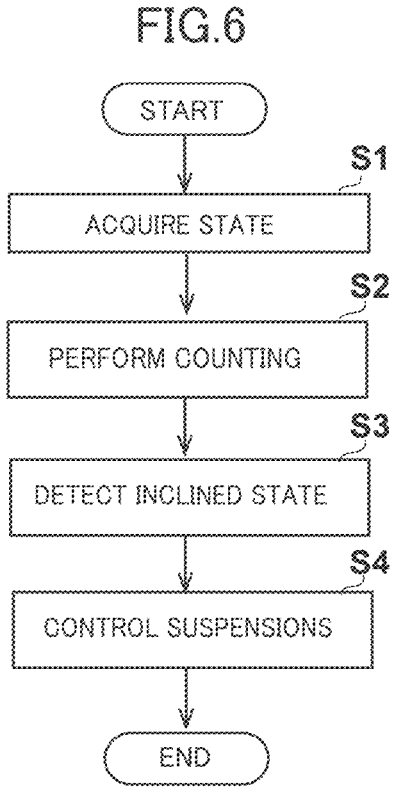
FIG. 5 is a flowchart illustrating one example of road-surface inclined-state detection processing performed by the vehicle control system and the vehicle control device according to the present embodiment.
FIG. 6 is a flowchart illustrating one example of vehicle control processing performed by the vehicle control system and the vehicle control device according to the present embodiment.
Figure 7:
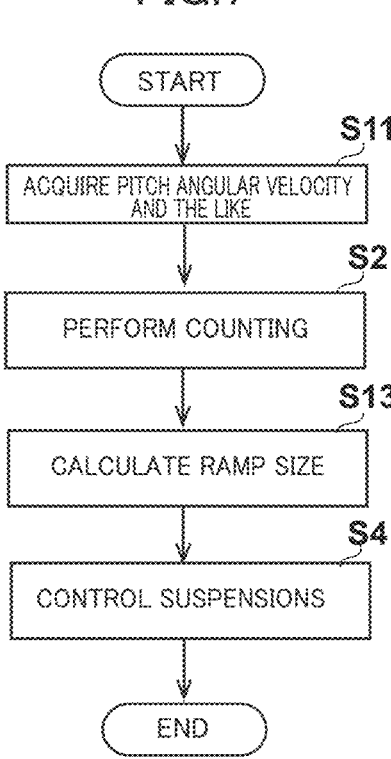
FIG. 7 is a flowchart illustrating another example of the vehicle control processing performed by the vehicle control system and the vehicle control device according to the present embodiment.
Figure 8:
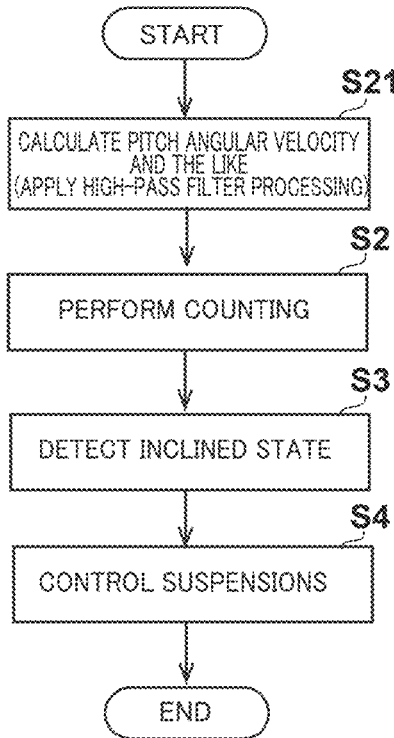
FIG. 8 is a flowchart illustrating still another example of the vehicle control processing performed by the vehicle control system and the vehicle control device according to the present embodiment.

FIG. 2 is a schematic diagram illustrating a configuration of the vehicle control system and the vehicle control device according to the present embodiment. FIG. 3 is a side view illustrating a right side of the vehicle on which the vehicle control system and the vehicle control device according to the present embodiment are mounted and that is in an inclined state. FIG. 4 is a time chart illustrating one example of operations of the vehicle control system and the vehicle control device according to the present embodiment. FIG. 5 is a flowchart illustrating one example of road-surface inclined-state detection processing performed by the vehicle control system and the vehicle control device according to the present embodiment. FIG. 6 is a flowchart illustrating one example of vehicle control processing performed by the vehicle control system and the vehicle control device according to the present embodiment. FIG. 7 is a flowchart illustrating another example of the vehicle control processing performed by the vehicle control system and the vehicle control device according to the present embodiment. FIG. 8 is a flowchart illustrating still another example of the vehicle control processing performed by the vehicle control system and the vehicle control device according to the present embodiment.

As illustrated in FIGS. 1 and 2, a vehicle control system S includes a vehicle control device 100 and, associated therewith, includes various types of sensors 200 including an IMU (Inertial Measurement Unit) 202, a stroke sensor 204, a vehicle velocity sensor 206, and an acceleration sensor 208, the front suspensions 30, and the rear suspensions 40.

The vehicle control device 100 operates with a battery (not illustrated) mounted on the vehicle 1 as a power supply and is mainly constituted of an ECU as an arithmetic processing unit including a microcomputer or the like comprised of a CPU 160 and the like. The various types of sensors 200 including the IMU 202, the stroke sensor 204, the vehicle velocity sensor 206, and the acceleration sensor 208, and the like are electrically connected to the vehicle control device 100. The vehicle control device 100 functions as a control device that variably controls the damping force and the stroke position of each of the front suspensions 30 and the rear suspensions 40 by executing a control program on the basis of electric signals output from these sensors and the like while referring to control data. The vehicle control device 100 has first to fourth input units 152 to 158, and an acquisition unit 162, a count unit 164, an inclined-state detection unit 166, and a control unit 168 in the CPU 160, which are illustrated as functional blocks. The control program and the like are stored in advance in a memory (not illustrated) and are read from the memory at the time of execution. The vehicle control device 100 may be a control device integrated with the drive-source control device 60. In this case, the vehicle control device 100 functions as a control device that controls the operating state of the engine as the drive source 20, and also functions as a control device that variably controls the damping force and the stroke position of each of the front suspensions 30 and the rear suspensions 40. In addition, the vehicle control device 100 may be a control device integrated with a dash display controller or a body control unit.

The first input unit 152 is an electric circuit to which an electric signal that is output from the IMU 202 detecting the accelerations in three-axis directions parallel to the x-axis, the y-axis, and the z-axis of a vehicle and the angular velocities around these three axes, and that indicates the detected accelerations and the detected angular velocities is input. The IMU 202 has an acceleration sensor (a G-sensor) and a gyrosensor (both not illustrated), and the acceleration sensor detects the accelerations in the three-axis directions parallel to the x-axis, the y-axis, and the z-axis and the gyrosensor detects the angular velocities around the three axes parallel to the x-axis, the y-axis, and the z-axis.

The second input unit 154 is an electric circuit to which an electric signal that is output from the stroke sensor 204 detecting the amount of stroke in the range of an effective stroke length between a full bump and a full rebound of each of the right and left front suspensions 30 and the right and left rear suspensions 40 with respect to, for example, a 1G-position, and that indicates the detected amount of stroke is input.

The third input unit 156 is an electric circuit to which an electric signal that is output from the vehicle velocity sensor 206 detecting the rotation speed of a shaft on the output side of a transmission (not illustrated) of the vehicle 1 and that indicates the detected rotation speed is input. As required, the vehicle velocity sensor 206 may detect the rotation speed of a wheel such as the front wheels 32 instead of the rotation speed of the shaft on the output side of the transmission.

The fourth input unit 158 is an electric circuit to which an electric signal that is output from the acceleration sensor (a G-sensor) 208 detecting the accelerations in the x-axis, y-axis, and z-axis directions and that indicates the detected accelerations is input. Typically, the acceleration sensor 208 may be applied to replace the IMU 202.

The acquisition unit 162 acquires a vehicle state (a vehicle attitude state) where pitching moment causing the front wheels 32 to move upward relative to the rear wheels 42 is applied to the vehicle 1 and where the rear suspensions 40 are stroked in the compressing direction, on the basis of the electric signal output from the IMU 202 and input to the first input unit 152. Specifically, it is preferable that the acquisition unit 162 acquires the pitch angular velocity, the pitch angle, and the vertical directional velocity (velocity in the vertical direction) of the vehicle 1 so as to appropriately acquire the above vehicle attitude state. The pitch angular velocity of the vehicle 1 can be acquired by the acquisition unit 162 on the basis of an output signal output from the gyrosensor in the IMU 202, and is an angular velocity A around the pitch axis of the vehicle 1. Typically, the pitch axis is an axis extending in parallel to the width direction (the direction of the y-axis) through the position of the center of gravity of the vehicle 1. The pitch angle of the vehicle 1 can be calculated by the acquisition unit 162 on the basis of an output signal output from the acceleration sensor in the IMU 202, is an inclination angle θ at which the vehicle 1 is inclined with respect to the horizontal plane, and typically corresponds to an inclination angle θ of a road surface R with respect to the horizontal plane. The vertical directional velocity of the vehicle 1 can be calculated by the acquisition unit 162 on the basis of an output signal output from the acceleration sensor in the IMU 202 and is a velocity V at which the vehicle 1 moves in parallel to the z-axis.

The acquisition unit 162 may calculate the pitch angular velocity A, the pitch angle θ, and the vertical directional velocity V of the vehicle 1 on the basis of the electric signal output from the stroke sensor 204 and input to the second input unit 154 so as to appropriately acquire the vehicle attitude state where pitching moment causing the front wheels 32 to move upward relative to the rear wheels 42 is applied to the vehicle 1 and where the rear suspensions 40 are stroked in the compressing direction. In this case, for example, the pitch angular velocity of the vehicle 1 can be calculated by the acquisition unit 162 through a differential operation of the pitch angle of the vehicle 1 calculated by the acquisition unit 162 on the basis of output signals output from the right, left, front, and rear stroke sensors 204 provided corresponding to the right and left front suspensions 30 and the right and left rear suspensions 40, respectively. The pitch angle of the vehicle 1 can be calculated by the acquisition unit 162 using a difference between front and rear stroke amounts on the basis of the output signals output from the right, left, front, and rear stroke sensors 204. The vertical directional velocity of the vehicle 1 can be calculated by the acquisition unit 162 through a differential operation of vertical components of the front and rear stroke amounts on the basis of output signals output from the front and rear stroke sensors 204.

The acquisition unit 162 may calculate the pitch angular velocity A, the pitch angle θ, and the vertical directional velocity V of the vehicle 1 on the basis of the electric signal output from the acceleration sensor 208 and input to the fourth input unit 158 so as to appropriately acquire the vehicle attitude state where pitching moment causing the front wheels 32 to move upward relative to the rear wheels 42 is applied to the vehicle 1 and where the rear suspensions 40 are stroked in the compressing direction. In this case, for example, the pitch angular velocity of the vehicle 1 can be calculated by the acquisition unit 162 through a differential operation of the pitch angle of the vehicle 1 calculated by the acquisition unit 162 on the basis of an output signal output from the acceleration sensor 208. The pitch angle of the vehicle 1 can be calculated corresponding to the component ratio of the acceleration or the like by the acquisition unit 162 on the basis of an output signal output from the acceleration sensor 208. The vertical directional velocity of the so-called sprung mass of the vehicle 1 can be calculated by the acquisition unit 162 through an integral operation of a vertical direction acceleration on the basis of an output signal output from the acceleration sensor 208.

The acquisition unit 162 may apply high-pass filter processing to the electric signals input to the first input unit 152, the second input unit 154, and the fourth input unit 158 when acquiring the pitch angular velocity A, the pitch angle θ, and the vertical directional velocity V of the vehicle 1. This can reduce drift components and offset components resulting from error components or gravitational acceleration components accumulated at the time of the calculation.

The count unit 164 starts counting after the vehicle attitude state acquired by the acquisition unit 162 meets a predetermined condition, and continues the counting until the vehicle attitude state fails to meet the predetermined condition, to enable an inclined state of the road surface R in which the vehicle attitude state where pitching moment causing the front wheels 32 to move upward relative to the rear wheels 42 is applied to the vehicle 1 and where the rear suspensions 40 are stroked in the compressing direction appears to be appropriately detected. Specifically, it is preferable that the count unit 164 starts counting after the pitch angular velocity A, the pitch angle θ, and the vertical directional velocity V of the vehicle 1, which are acquired by the acquisition unit 162, all exceed predetermined thresholds each being set corresponding thereto, to enable an inclined state of the road surface R, in other words, a situation where the road surface R having been a flat road surface has changed to a ramp road surface being an inclined road surface to be more appropriately detected. Furthermore, to enable a change of the road surface R to a ramp road surface to be more appropriately detected, it is preferable to set these predetermined thresholds as positive values assuming that the rotation direction in which the front wheels 32 move upward relative to the rear wheels 42 is the positive direction as for the pitch angular velocity A and the pitch angle θ of the vehicle 1 and assuming that the positive direction of the z-axis is the positive direction as for the vertical directional velocity V. It suffices that, to enable the state of the road surface R to be more appropriately detected while the road surface R is a ramp road surface, the count unit 164 continues counting while the pitch angular velocity A, the pitch angle θ, and the vertical directional velocity V are above the corresponding predetermined thresholds and clears the count values when the values become equal to or less than the predetermined thresholds. To prevent the counting from continuing unnecessarily for a long time, the count unit 164 may saturate the count values to fix the count values when a predetermined time has elapsed since the counting is started after all the predetermined thresholds have been exceeded.

As illustrated in FIG. 4, a period in which the pitch angular velocity A is above the pitch angular velocity threshold set at a positive value is between a time t3 and a time t5 and between a time t8 and a time t11 (corresponding FLAG is changed to high level H from low level L in each period), a period in which the pitch angle θ is above the pitch angle threshold set at a positive value is until a time t1, between a time t2 and a time t7, and after a time t10 (corresponding FLAG is changed to high level H from low level L in each period), and a period in which the vertical directional velocity V is above the vertical directional velocity threshold set at a positive value is between a time t4 and a time t6 and between a time t9 and a time t12 (corresponding FLAG is changed to high level H from low level L in each period). As a result, a period in which the pitch angular velocity A is above the pitch angular velocity threshold, the pitch angle θ is above the pitch angle threshold, and the vertical directional velocity V is above the vertical directional velocity threshold is between the time t4 and the time t5 and between the time t10 and the time t11 (corresponding FLAG is changed to high level H from low level L in each period).

The inclined-state detection unit 166 detects that the road surface R on which the vehicle 1 travels is in an inclined state in which the vehicle attitude state where pitching moment causing the front wheels 32 to move upward relative to the rear wheels 42 is applied to the vehicle 1 and where the rear suspensions 40 are stroked in the compressing direction appears, in other words, the inclined state of the road surface R changing from a flat road surface to a ramp road surface, according to the count values counted by the count unit 164. Specifically, it is preferable that the inclined-state detection unit 166 calculates the size (ramp size) of a ramp road on the road surface R according to the count values counted by the count unit 164, to enable an inclined state of the road surface R, that is, an inclined state of the road surface R being a ramp road surface to be more appropriately detected. In a case where it is supposed that the vehicle 1 has passed through the road surface R being a ramp road surface, the inclined-state detection unit 166 may end the detection of an inclined state of the road surface R when the stroke of the rear suspensions 40 has reached a largest stretch amount, to prevent the detection of the inclined state from continuing unnecessarily for a long time. To appropriately detect an inclined state of the road surface R during traveling of the vehicle 1, the inclined-state detection unit 166 may detect an inclined state of the road surface R when the velocity (vehicle velocity) of the vehicle 1 calculated based on the electric signal input to the third input unit 156 is equal to or more than a predetermined threshold. The ramp size being the size of the ramp road surface is typically defined by the length in the traveling direction of the vehicle 1 and the vertical direction length (height).

The control unit 168 controls constituent elements of the vehicle 1 according to the inclined state of the road surface R detected by the inclined-state detection unit 166 so as to control the attitude of the vehicle 1 in a manner in which a feeling of strangeness received by the driver is decreased when an attitude change occurs in the vehicle 1 due to the inclined road surface R. It is preferable that these constituent elements of the vehicle 1 are typically at least either the front suspensions 30 or the rear suspensions 40. In this case, the control unit 168 controls the damping forces of at least either thereof. Specifically, the control unit 168 controls the damping forces of at least either the front suspensions 30 or the rear suspensions 40 according to the ramp size detected by the inclined-state detection unit 166. Typically, it is preferable to increase the damping forces of at least either the front suspensions 30 or the rear suspensions 40 as the ramp size detected by the inclined-state detection unit 166 is larger. For example, when the rear suspensions 40 are about to stroke in the stretching direction as a reaction after the rear suspensions 40 stroke in the compression direction, the control unit 168 may adjust the damping forces of the rear suspension 40 to suppress the stroke in the stretching direction and may further adjust the damping forces of the front suspensions 30 to suppress an attitude change of the vehicle 1 at the time, as required. At the time of such adjustment of the damping forces of at least either the front suspensions 30 or the rear suspensions 40, the value of each of the length in the traveling direction of the vehicle 1 and the vertical direction length (height) that define the ramp size may be used as a parameter and values of the damping forces thereof may be set according to the values of these parameters. As required, the stroke positions of at least either the front suspensions 30 or the rear suspensions 40 may be adjusted in addition to the damping forces of at least either the front suspensions 30 or the rear suspensions 40.

An example of the operation performed by the vehicle control device 100 having the configuration described above is explained in detail below with reference also to FIGS. 5 to 8.

First, focusing on the operations of the acquisition unit 162, the count unit 164, and the inclined-state detection unit 166 in the vehicle control device 100, one example of these operations is road-surface inclined-state detection processing as in a flowchart illustrated in FIG. 5. The road-surface inclined-state detection processing illustrated in FIG. 5 is typically started at a timing when a power switch (not illustrated) of a vehicle is changed from an off-state to an on-state and the CPU 110 of the vehicle control device 100 is activated, and the road-surface inclined-state detection processing proceeds to a process at Step S1. This road-surface inclined-state detection processing is performed repeatedly with a predetermined period while the CPU 110 is activated.

As illustrated in FIG. 5, in the process at Step S1, the acquisition unit 162 acquires a vehicle attitude state where pitching moment causing the front wheels 32 to move upward relative to the rear wheels 42 is applied to the vehicle 1 and where the rear suspensions 40 are stroked in the compressing direction, on the basis of the electric signal output from the IMU 202 and input to the first input unit 152 as described above. Specifically, it is preferable to acquire the pitch angular velocity, the pitch angle, and the vertical directional velocity of the vehicle 1 to acquire this vehicle attitude state more appropriately. As described above, the acquisition unit 162 may calculate the pitch angular velocity A, the pitch angle θ, and the vertical directional velocity V of the vehicle 1 on the basis of the electric signal output from the stroke sensor 204 and input to the second input unit 154, or may calculate the pitch angular velocity A, the pitch angle θ, and the vertical directional velocity V of the vehicle 1 on the basis of the electric signal output from the acceleration sensor 208 and input to the fourth input unit 158. Alternatively, as described above, the acquisition unit 162 may apply high-pass filter processing to the electric signals input to the first input unit 152, the second input unit 154, and the fourth input unit 158 at the time of calculation of the pitch angular velocity A, the pitch angle θ, and the vertical directional velocity V of the vehicle 1. Accordingly, the process at Step S1 is completed, and the road-surface inclined-state detection processing proceeds to a process at Step S2.

In the process at Step S2, as described above, to enable the inclined state of the road surface R in which a vehicle attitude state where pitching moment causing the front wheels 32 to move upward relative to the rear wheels 42 is applied to the vehicle 1 and where the rear suspensions 40 are stroked in the compressing direction appears to be appropriately detected, the count unit 164 starts counting after the vehicle attitude state acquired by the acquisition unit 162 meets a predetermined condition, and continues the counting until this vehicle attitude state fails to meet the predetermined condition. Specifically, to enable an inclined state of the road surface R, in other words, a situation where the road surface R having been a flat road surface has changed to a ramp road surface being an inclined road surface to be more appropriately detected, it is preferable to start counting after the pitch angular velocity A, the pitch angle θ, and the vertical directional velocity V of the vehicle 1 acquired by the acquisition unit 162 all exceed predetermined thresholds each being set corresponding thereto. As described above, to enable the situation where the road surface R has changed to a ramp road surface to be more appropriately detected, it is preferable that these predetermined thresholds are set at values greater than or equal to zero assuming that the rotation direction in which the front wheels 32 move upward relative to the rear wheels 42 is the positive direction as for the pitch angular velocity A and the pitch angle θ of the vehicle 1, and assuming that the positive direction of the z-axis is the positive direction as for the vertical directional velocity V. As described above, it suffices that, to enable the state of the road surface R to be more appropriately detected while the road surface R is a ramp road surface, the count unit 164 continues counting while the pitch angular velocity A, the pitch angle θ, and the vertical directional velocity V are above the corresponding predetermined thresholds and clears the count values when these values become equal to or less than the predetermined thresholds. As described above, to prevent the counting from continuing unnecessarily for a long time, the count unit 164 may saturate the count values to fix the count values when a predetermined time has elapsed since the counting is started after these values have exceeded the corresponding predetermined thresholds. Accordingly, the process at Step S2 is completed and the road-surface inclined-state detection processing proceeds to a process at Step S3.

In the process at Step S3, as described above, the inclined-state detection unit 166 detects that the road surface R on which the vehicle 1 travels is in an inclined state in which the vehicle attitude state where pitching moment causing the front wheels 32 to move upward relative to the rear wheels 42 is applied to the vehicle 1 and where the rear suspensions 40 are stroked in the compressing direction appears, in other words, the inclined state of the road surface R having changed from a flat road surface to a ramp road surface, according to the count values counted by the count unit 164. Specifically, it is preferable that the inclined-state detection unit 166 calculates the ramp size on the road surface R according to the count values counted by the count unit 164, to enable an inclined state of the road surface R, that is, the inclined state of the road surface R being a ramp road surface to be more appropriately detected. In a case where it is supposed that vehicle 1 has passed through the road surface R being a ramp road surface, the inclined-state detection unit 166 may end the detection of an inclined state of the road surface R when the stroke of the rear suspensions 40 has reached a largest stretch amount, to prevent the detection of the inclined state from continuing unnecessarily for a long time. To detect an inclined state of the road surface R during traveling of the vehicle 1, the inclined-state detection unit 166 may detect an inclined state of the road surface R when the vehicle velocity calculated based on the electric signal input to the third input unit 156 is equal to or more than a predetermined threshold. Accordingly, this series of the road-surface inclined-state detection processing ends.

Next, focusing on the operation of the control unit 168 in addition to those of the acquisition unit 162, the count unit 164, and the inclined-state detection unit 166 in the vehicle control device 100, one example of these operations is vehicle control processing as in a flowchart illustrated in FIG. 6. In this vehicle control processing, the processes from Step S1 to Step S3 are the same as those in the road-surface inclined-state detection processing illustrated in FIG. 5 and the vehicle control processing proceeds to a process at Step S4 when the process at Step S3 is completed.

As illustrated in FIG. 6, in the process at Step S4, as described above, the control unit 168 controls damping forces of constituent elements of the vehicle 1, typically at least either the front suspensions 30 or the rear suspensions 40 according to the inclined state of the road surface R detected by the inclined-state detection unit 166, to control the attitude of the vehicle 1 in a manner in which a feeling of strangeness received by the driver is decreased when an attitude change occurs in the vehicle 1 due to the inclined road surface R. Specifically, the control unit 168 controls damping forces of at least either the front suspensions 30 or the rear suspensions 40 according to the ramp size detected by the inclined-state detection unit 166. At the time of such adjustment of the damping forces of at least either the front suspensions 30 or the rear suspensions 40, the value of each of the length in the traveling direction of the vehicle 1 and the vertical direction length (height) that define the ramp size may be used as a parameter and the values of the damping forces thereof may be set according to the values of these parameters. At the time of setting the values of the damping forces, the control unit 168 may read table data in which a relation between the values of these parameters and the values of the damping forces is defined in advance and that is stored in a memory, to refer to the read table data. Accordingly, this series of the vehicle control processing ends.

Next, as for the operations of the acquisition unit 162, the count unit 164, the inclined-state detection unit 166, and the control unit 168 in the vehicle control device 100, focusing on the acquisition of the pitch angular velocity, the pitch angle, and the vertical directional velocity of the vehicle 1 on the basis of the electric signal output from the IMU 202 and input to the first input unit 152, the electric signal output from the stroke sensor 204 and input to the second input unit 154, or the electric signal output from the acceleration sensor 208 and input to the fourth input unit 158 as described above in the operation performed by the acquisition unit 162, and focusing on the calculation of the ramp size on the road surface R according to the count values counted by the count unit 164 as described above in the operation performed by the inclined-state detection unit 166, one example of these operations is vehicle control processing as in a flowchart illustrated in FIG. 7. In this vehicle control processing, the process at Step S2 and the process at Step S4 are the same as those in the vehicle control processing illustrated in FIG. 6, and the process at Step S1 and the process at Step S3 are replaced by a process at Step S11 and a process at Step S13.

As illustrated in FIG. 7, in the process at Step S11, as described above, the acquisition unit 162 acquires the pitch angular velocity, the pitch angle, and the vertical directional velocity of the vehicle 1 on the basis of the electric signal output from the IMU 202 and input to the first input unit 152, the electric signal output from the stroke sensor 204 and input to the second input unit 154, or the electric signal output from the acceleration sensor 208 and input to the fourth input unit 158, to enable the vehicle attitude state where pitching moment causing the front wheels 32 to move upward relative to the rear wheels 42 is applied to the vehicle 1 and where the rear suspensions 40 are stroked in the compressing direction to be more appropriately acquired. Accordingly, the process at Step S11 is completed, the vehicle control processing proceeds to the process at Step S2, and the vehicle control processing proceeds to the process at Step S13 after the process at Step S2 is completed.

In the process at Step S13, as described above, the inclined-state detection unit 166 calculates the ramp size on the road surface R according to the count values counted by the count unit 164, to more appropriately detect that the road surface R on which the vehicle 1 travels is in an inclined state in which the vehicle attitude state where pitching moment causing the front wheels 32 to move upward relative to the rear wheels 42 is applied to the vehicle 1 and where the rear suspensions 40 are stroked in the compressing direction appears, in other words, the inclined state of the road surface R having changed from a flat road surface to a ramp road surface. Accordingly, the process at Step S13 is completed, the vehicle control processing proceeds to the process at Step S4, and this series of the vehicle control processing ends when the process at Step S4 is completed.

Next, as for the operations of the acquisition unit 162, the count unit 164, the inclined-state detection unit 166, and the control unit 168 in the vehicle control device 100, focusing on the acquisition of the pitch angular velocity, the pitch angle, and the vertical directional velocity of the vehicle 1 on the basis of the electric signal output from the IMU 202 and input to the first input unit 152, the electric signal output from the stroke sensor 204 and input to the second input unit 154, or the electric signal output from the acceleration sensor 208 and input to the fourth input unit 158 as described above as the operation performed by the acquisition unit 162, and the application of the high-pass filter processing to the electric signals input to the first input unit 152, the second input unit 154, and the fourth input unit 158 at a time when the acquisition unit 162 acquires the pitch angular velocity A, the pitch angle θ, and the vertical directional velocity V of the vehicle 1 as described above, one example of these operations is vehicle control processing as in a flowchart illustrated in FIG. 8. In this vehicle control processing, the processes from Step S2 to Step S4 are the same as those in the vehicle control processing illustrated in FIG. 6, and the process at Step S1 is replaced by a process at Step S21.

As illustrated in FIG. 8, in the process at Step S21, as described above, the acquisition unit 162 acquires the pitch angular velocity, the pitch angle, and the vertical directional velocity of the vehicle 1 on the basis of the electric signal output from the IMU 202 and input to the first input unit 152, the electric signal output from the stroke sensor 204 and input to the second input unit 154, or the electric signal output from the acceleration sensor 208 and input to the fourth input unit 158, to more appropriately acquire the vehicle attitude state where pitching moment causing the front wheels 32 to move upward relative to the rear wheels 42 is applied to the vehicle 1 and where the rear suspensions 40 are stroked in the compressing direction. In this case, as described above, the acquisition unit 162 applies the high-pass filter processing to the electric signals input to the first input unit 152, the second input unit 154, and the fourth input unit 158, and acquires the pitch angular velocity A, the pitch angle θ, and the vertical directional velocity V of the vehicle 1 on the basis of the electric signals having been subjected to the high-pass filter processing, to decrease drift components and offset components resulting from error components or gravitational acceleration components accumulated at the time of the acquisition. Accordingly, the process at Step S21 is completed, the vehicle control processing sequentially proceeds to the process at Step S2, the process at Step S3, and the process at Step S4, and this series of the vehicle control processing ends when the process at Step S4 is completed.

As is apparent from the above explanations, a first aspect of a road-surface inclined-state detection method according to the present embodiment includes: an acquisition step of acquiring a vehicle state where pitching moment causing front wheels 32 of a vehicle 1 to move upward in a vertical direction relative to rear wheels 42 of the vehicle 1 is applied to the vehicle 1, and where rear suspensions 40 suspending the rear wheels 42 are stroked in a compressing direction; a count step of starting counting after the vehicle state acquired in the acquisition step meets a predetermined condition, and continuing the counting until the vehicle state fails to meet the predetermined condition; and an inclined-state detection step of detecting an inclined state of a road surface R on which the vehicle 1 travels, according to count values counted in the count step. Accordingly, an inclined state of the road surface R on which the vehicle 1 travels can be appropriately detected.

In a second aspect of the road-surface inclined-state detection method according to the present embodiment, in addition to the first aspect, a pitch angular velocity of the vehicle 1, a pitch angle of the vehicle 1, and a velocity in the vertical direction of a sprung mass of the vehicle 1 are acquired to acquire the vehicle state in the acquisition step, and the counting is started in the count step after the pitch angular velocity, the pitch angle, and the velocity in the vertical direction acquired in the acquisition step all exceed predetermined thresholds that are each set corresponding thereto. Accordingly, a change of the road surface R having been a flat road surface to a ramp road surface being an inclined road surface can be more appropriately detected.

In a third aspect of the road-surface inclined-state detection method according to the present embodiment, in addition to the second aspect, each of the predetermined thresholds that are set corresponding to the pitch angular velocity, the pitch angle, and the vertical directional velocity is set at a value greater than or equal to zero. Accordingly, a change of the road surface R having been a flat road surface to a ramp road surface being an inclined road surface can be more appropriately detected.

In a fourth aspect of the road-surface inclined-state detection method according to the present embodiment, in addition to the third aspect, the count values are cleared in the count step when any of the pitch angular velocity, the pitch angle, the velocity in the vertical direction acquired in the acquisition step falls to be equal to or lower than the predetermined thresholds. Accordingly, while the road surface R is a ramp road surface, this state can be more appropriately detected.

In a fifth aspect of the road-surface inclined-state detection method according to the present embodiment, in addition to any of the first to fourth aspects, the count values are saturated in the count step when a predetermined time elapses from start of the counting. Accordingly, it is possible to prevent the counting from continuing unnecessarily for a long time.

In a sixth aspect of the road-surface inclined-state detection method according to the present embodiment, in addition to any of the first to fifth aspects, a ramp size of a ramp road surface being the road surface is calculated in the inclined-state detection step according to the count values counted in the count step, and control is executed in a control step to increase damping forces of at least either front suspensions 30 or the rear suspensions 40 of the vehicle as the ramp size is larger. Accordingly, the inclined state of the road surface R being a ramp road surface can be more appropriately detected, and the attitude of the vehicle 1 can be controlled in a manner in which a feeling of strangeness received by the driver is decreased.

In a seventh aspect of the road-surface inclined-state detection method according to the present embodiment, in addition to any of the first to sixth aspects, detection of the inclined state ends in the inclined-state detection step when a stroke of the rear suspensions 40 reaches a largest stretch amount. Accordingly, it is possible to prevent the detection of the inclined state from continuing unnecessarily for a long time.

In an eighth aspect of the road-surface inclined-state detection method according to the present embodiment, in addition to the second aspect, the pitch angular velocity, the pitch angle, and the velocity in the vertical direction are acquired based on an electric signal from an inertia measurement unit 202 in the acquisition step. Accordingly, a vehicle attitude state where pitching moment causing the front wheels 32 to move upward relative to the rear wheels 42 is applied to the vehicle 1 and where the rear suspensions 40 are stroked in the compressing direction can be appropriately calculated.

In a ninth aspect of the road-surface inclined-state detection method according to the present embodiment, in addition to the second aspect, the pitch angular velocity, the pitch angle, and the velocity in the vertical direction are calculated based on an electric signal from a stroke sensor 204 in the acquisition step. Accordingly, a vehicle attitude state where pitching moment causing the front wheels 32 to move upward relative to the rear wheels 42 is applied to the vehicle 1 and where the rear suspensions 40 are stroked in the compressing direction can be appropriately calculated.

In a tenth aspect of the road-surface inclined-state detection method according to the present embodiment, in addition to the second aspect, the pitch angular velocity, the pitch angle, and the velocity in the vertical direction are calculated based on an electric signal from an acceleration sensor 206 in the acquisition step. Accordingly, a vehicle attitude state in which pitching moment causing the front wheels 32 to move upward relative to the rear wheels 42 is applied to the vehicle 1 and where the rear suspensions 40 are stroked in the compressing direction can be appropriately calculated.

In an eleventh aspect of the road-surface inclined-state detection method according to the present embodiment, in addition to any of the first to tenth aspects, the inclined state is detected in the inclined-state detection step when a velocity of the vehicle 1 has a value equal to or more than a predetermined threshold. Accordingly, the inclined state of the road surface R can be appropriately detected during traveling of the vehicle 1.

A vehicle control method of another aspect of the present embodiment includes: an acquisition step of acquiring a pitch angular velocity of a vehicle, a pitch angle of the vehicle, and a velocity in a vertical direction of a sprung mass of the vehicle; a count step of starting counting after the pitch angular velocity, the pitch angle, and the velocity in the vertical direction calculated in the acquisition step all exceed predetermined thresholds that are each set corresponding thereto; a ramp-size calculation step of calculating a ramp size according to count values counted in the count step when the road surface is a ramp road surface; and a control step of controlling damping forces of at least either front suspensions or rear suspensions of the vehicle according to the ramp size calculated in the ramp-size calculation step. Accordingly, the inclined state of a road surface R being a ramp road surface can be more appropriately detected, and the attitude of the vehicle 1 can be controlled in a manner in which a feeling of strangeness received by the driver is decreased.

A vehicle control method of still another aspect of the present embodiment includes: a calculation step of calculating a pitch angular velocity of a vehicle, a pitch angle of the vehicle, and a velocity in a vertical direction of a sprung mass of the vehicle, where high-pass filter processing to decrease offset components and drift components in the pitch angular velocity, the pitch angle, and the velocity in the vertical direction is applied; a count step of starting counting after the pitch angular velocity, the pitch angle, and the velocity in the vertical direction calculated in the calculation step while the high-pass filter processing is applied thereto all exceed predetermined thresholds that are each set corresponding thereto; an inclined-state detection step of detecting an inclined state of a road surface, according to count values counted in the count step; and a control step of controlling damping forces of at least either front suspensions or rear suspensions of the vehicle according to the inclined state detected in the inclined-state detection step. Accordingly, the inclined state of the road surface R where drift components and offset components resulting from error components or gravitational acceleration components accumulated at the time of calculation in the calculation step are decreased to prevent unnecessary detection of an inclined state can be more appropriately detected, and the attitude of the vehicle 1 can be controlled in a manner in which a feeling of strangeness received by the driver is decreased.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a road-surface inclined-state detection method that can appropriately detect the inclined state of a road surface on which a vehicle travels, and further to provide a vehicle control method that can appropriately detect the inclined state of a road surface on which a vehicle travels and that can control the attitude of the vehicle in a manner in which a feeling of strangeness received by a driver is decreased, and because of its general purposes and universal characteristics, applications of the present invention can be expected in a wide range in the field of automobiles including motorcycles and the like.

What is claimed is:

1. A road-surface inclined-state detection method, comprising:
an acquisition step of acquiring a vehicle state where pitching moment causing front wheels of a vehicle to move upward in a vertical direction relative to rear wheels of the vehicle is applied to the vehicle, and where rear suspensions suspending the rear wheels are stroked in a compressing direction;

a count step of starting counting after the vehicle state acquired in the acquisition step meets a predetermined condition, and continuing the counting until the vehicle state fails to meet the predetermined condition; and an inclined-state detection step of detecting an inclined state of a road surface on which the vehicle travels, according to count values counted in the count step.

2. The road-surface inclined-state detection method according to claim 1, wherein a pitch angular velocity of the vehicle, a pitch angle of the vehicle, and a velocity in the vertical direction of a sprung mass of the vehicle are acquired to acquire the vehicle state in the acquisition step, and the counting is started in the count step after the pitch angular velocity, the pitch angle, and the velocity in the vertical direction acquired in the acquisition step all exceed predetermined thresholds that are each set corresponding thereto.

3. The road-surface inclined-state detection method according to claim 2, wherein each of the predetermined thresholds is set at a value greater than or equal to zero.

4. The road-surface inclined-state detection method according to claim 3, wherein the count values are cleared in the count step when any of the pitch angular velocity, the pitch angle, the velocity in the vertical direction acquired in the acquisition step falls to be equal to or lower than the predetermined thresholds.

5. The road-surface inclined-state detection method according to claim 1, wherein the count values are saturated in the count step when a predetermined time elapses from start of the counting.

6. The road-surface inclined-state detection method according to claim 1, wherein a ramp size of a ramp road surface being the road surface is calculated in the inclined-state detection step according to the count values counted in the count step, and further comprising: a control step of controlling damping forces of at least either front suspensions or the rear suspensions of the vehicle according to the ramp size.

7. The road-surface inclined-state detection method according to claim 1, wherein detection of the inclined state ends in the inclined-state detection step when a stroke of the rear suspensions reaches a largest stretch amount.

8. The road-surface inclined-state detection method according to claim 2, wherein the pitch angular velocity, the pitch angle, and the velocity in the vertical direction are acquired based on an electric signal from an inertia measurement unit in the acquisition step.

9. The road-surface inclined-state detection method according to claim 2, wherein the pitch angular velocity, the pitch angle, and the velocity in the vertical direction are calculated based on an electric signal from a stroke sensor in the acquisition step.

10. The road-surface inclined-state detection method according to claim 2, wherein the pitch angular velocity, the pitch angle, and the velocity in the vertical direction are calculated based on an electric signal from an acceleration sensor in the acquisition step.

11. The road-surface inclined-state detection method according to claim 1, wherein the inclined state is detected in the inclined-state detection step when a velocity of the vehicle has a value equal to or more than a predetermined threshold.

12. A vehicle control method, comprising:

an acquisition step of acquiring a pitch angular velocity of a vehicle, a pitch angle of the vehicle, and a velocity in a vertical direction of a sprung mass of the vehicle;

a count step of starting counting after the pitch angular velocity, the pitch angle, and the velocity in the vertical direction calculated in the acquisition step all exceed predetermined thresholds that are each set corresponding thereto;

a ramp-size calculation step of calculating a ramp size according to count values counted in the count step when a road surface is a ramp road surface; and a control step of controlling damping forces of at least either front suspensions or rear suspensions of the vehicle according to the ramp size calculated in the ramp-size calculation step.

13. A vehicle control method, comprising:

a calculation step of calculating a pitch angular velocity of a vehicle, a pitch angle of the vehicle, and a velocity in a vertical direction of a sprung mass of the vehicle, where high-pass filter processing to decrease offset components and drift components in the pitch angular velocity, the pitch angle, and the velocity in the vertical direction is applied;

a count step of starting counting after the pitch angular velocity, the pitch angle, and the velocity in the vertical direction calculated in the calculation step while the high-pass filter processing is applied thereto all exceed predetermined thresholds that are each set corresponding thereto;

an inclined-state detection step of detecting an inclined state of a road surface, according to count values counted in the count step; and a control step of controlling damping forces of at least either front suspensions or rear suspensions of the vehicle according to the inclined state detected in the inclined-state detection step.

* * * * *